US008799139B1

(12) United States Patent
Aggarwal et al.

(10) Patent No.: US 8,799,139 B1
(45) Date of Patent: Aug. 5, 2014

(54) POSITION-BASED AUCTION

(75) Inventors: Gagan Aggarwal, Sunnyvale, CA (US); Jon Feldman, New York, NY (US); Shanmugavelayutham Muthukrishnan, New York, NY (US); Rohit Rao, New York, NY (US); Adam Wildavsky, Jackson Heights, NY (US)

(73) Assignee: Google Inc., Mountain View, CA (US)

( * ) Notice: Subject to any disclaimer, the term of this patent is extended or adjusted under 35 U.S.C. 154(b) by 843 days.

(21) Appl. No.: 11/692,030

(22) Filed: Mar. 27, 2007

(51) Int. Cl.
*G06Q 40/00* (2012.01)

(52) U.S. Cl.
USPC ...... 705/37; 705/14.4; 705/14.41; 705/14.53; 705/14.49; 705/14.6; 705/14.73

(58) Field of Classification Search
USPC ........ 705/37, 14.4, 14.41, 14.49, 14.53, 14.6, 705/14.73
See application file for complete search history.

(56) References Cited

U.S. PATENT DOCUMENTS 5,835,896 A 11/1998 Fisher et al.
5,905,975 A * 5/1999 Ausubel .......................... 705/37
5,974,398 A 10/1999 Hanson et al.
6,078,866 A 6/2000 Buck et al.
6,243,691 B1 6/2001 Fisher et al.
6,269,361 B1 7/2001 Davis et al.
6,973,436 B1 12/2005 Shkedi
6,985,885 B1 * 1/2006 Goldberg et al. ............... 705/37
7,062,466 B2 6/2006 Wagner et al.
7,072,853 B2 7/2006 Shkedi
7,177,832 B1 2/2007 Semret et al.
7,191,147 B2 3/2007 Heene et al.
7,225,151 B1 * 5/2007 Konia ............................. 705/37
2003/0236739 A1 * 12/2003 Borgeson et al. ............... 705/37
2004/0148222 A1 7/2004 Sabella et al.
2006/0026060 A1 * 2/2006 Collins ........................... 705/14
2006/0253425 A1 11/2006 Borgs et al.
2007/0016473 A1 * 1/2007 Anderson et al. ............... 705/14
2008/0004962 A1 1/2008 Muthukrishnan et al.
2008/0249855 A1 * 10/2008 Collins et al. ................... 705/14

OTHER PUBLICATIONS

Chen, D. Y. (2009). Essays on mobile advertising and commerce. (Order No. 3365219, Harvard University). ProQuest Dissertations and Theses, 106-n/a. Retrieved from http://search.proquest.com/docview/304891044?accountid=14753. (304891044).*
Shihada, B. (2001). Active network approach to the design of secure online auction systems. (Order No. MQ66614, Dalhousie University (Canada)). ProQuest Dissertations and Theses, 91-91 p. Retrieved from http://search.proquest.com/docview/304733223?accountid=14753. (304733223).*

(Continued)

*Primary Examiner* — Muriel Tinkler
(74) *Attorney, Agent, or Firm* — Fish & Richardson P.C.

(57) ABSTRACT

A method is described that includes accessing bids for ranked goods and minimum rank indicators that each specifies a lowest rank for a good that is acceptable to a bidder, assigning a ranked good to a first bidder based on a first bid and a first minimum rank indicator each associated with the first bidder, and outputting a signal indicative of a cost of the assigned rank good based on a second bid associated with a next highest bidder having a second minimum rank indicator that specifies a rank that is inclusive of a rank of the ranked good assigned to the first bidder.

31 Claims, 7 Drawing Sheets

(56) References Cited

OTHER PUBLICATIONS

Leonard, Herman B. "Elicitation of Honest Preferences for the Assignment of Individuals to Positions" *The Journal of Political Economy*, vol. 91, Issue 3 (Jun. 1983) pp. 461-479.
Alvin E. Roth and Axel Ockenfels, "Last-Minute Bidding and the Rules for Ending Second-Price Auctions: Evidence from eBay and Amazon Auctions on the Internet," *American Economic Review*, vol. 92, No. 4, Sep. 2002, 1093-1103.
Borgs et al., "Bid optimization in online advertisement auctions", presented Jun. 11, 2006 at the Second Workshop on Sponsored Search Auctions, 14 pages.
Eso et al., "An Iterative Online Auction for Airline Seats", IBM Research Report RC 21987, 2001, 14 pages.

* cited by examiner

600

| Bidder (602) | Bid (604) | Minimum Rank (606) | Assigned Rank (608) | Cost (610) |
|---|---|---|---|---|
| A | $5.00 | 5 | 1 | $4.00 |
| B | $4.00 | 5 | 2 | $3.00 |
| C | $3.00 | 5 | 3 | $1.00 |
| D | $2.00 | 2 | - | - |
| E | $1.00 | 5 | 4 | $0.05 |

FIG. 6

POSITION-BASED AUCTION

TECHNICAL FIELD

This instant specification relates to the auction of ranked goods.

BACKGROUND

Many popular search engines run an auction to determine the placement of advertisements next to search results. Current auctions performed by search engines, such as Google™ and Yahoo!®, permit advertisers to specify a single amount as their bid in the auction. This bid can be interpreted as the maximum amount the advertiser is willing to pay per click on its advertisement. In some current systems, the advertisers pay for each user who clicks on their advertisement, and the amount charged depends on the bids of other advertisers participating in the auction.

When search queries are received at the search engines, the bids may be used to rank advertisements related to the search queries for presentation with the search results. Advertisers may seek to have a high ranking, which can correspond to a more prominent display of their advertisements.

SUMMARY

In general, this specification describes an auction of ranked goods.

In a first general aspect, a method is described. The method includes accessing bids for ranked goods and minimum rank indicators that each specifies a lowest rank for a good that is acceptable to a bidder, assigning a ranked good to a first bidder based on a first bid and a first minimum rank indicator each associated with the first bidder, and outputting a signal indicative of a cost of the assigned rank good based on a second bid associated with a next highest bidder having a second minimum rank indicator that specifies a rank that is inclusive of a rank of the ranked good assigned to the first bidder.

In a second general aspect, another method is described. The method includes accessing bids associated with bidders for advertisement placement, accessing for each bidder a minimum position indicator that specifies a lowest ranked position that is acceptable for the advertisement placement, assigning a ranked position for an advertisement associated with a first bidder based on a first bid from the first bidder and a first minimum position indicator from the first bidder, and outputting a signal indicative of a cost for the ranked position based on a second bid submitted by a next highest bidder having a second minimum position indicator that specifies a ranking that is inclusive of a rank of the ranked position assigned to the first bidder.

In another general aspect, a system is described. The system includes a data store for storing bids for ranked goods and minimum rank indicators that each specifies a lowest rank for the good that is acceptable for a bidder, an assigning module for assigning a ranked good to a first bidder based on a first bid and a first minimum rank indicator each associated with the first bidder, and means for outputting a signal indicative of a cost of the ranked good based on a second bid submitted by a next highest bidder having a second minimum rank indicator that is inclusive of a rank of the assigned ranked good.

In certain implementations, the systems and methods described here may provide none, one, or more of the following advantages. Simple allocation and pricing algorithms that include position restraints are provided, where the algorithms generalize desirable properties of current auctions that do not have position restraints. Auction attributes include an envy-free or symmetric Nash equilibrium (i.e., no actor has anything to gain by changing only his or her own strategy unilaterally) with the same outcome in allocation and pricing as the truthful Vickrey-Clarke-Groves (VCG) auction. Additionally, an auction can include an equilibrium that is the best equilibrium for advertisers in terms of a profit made by each advertiser.

The details of one or more embodiments of the invention are set forth in the accompanying drawings and the description below. Other features and advantages of the invention will be apparent from the description and drawings, and from the claims.

DESCRIPTION OF DRAWINGS

FIG. 6 shows an exemplary bidding scenario in an auction for ranked goods.

Like reference symbols in the various drawings indicate like elements.

DETAILED DESCRIPTION

Figure 1:
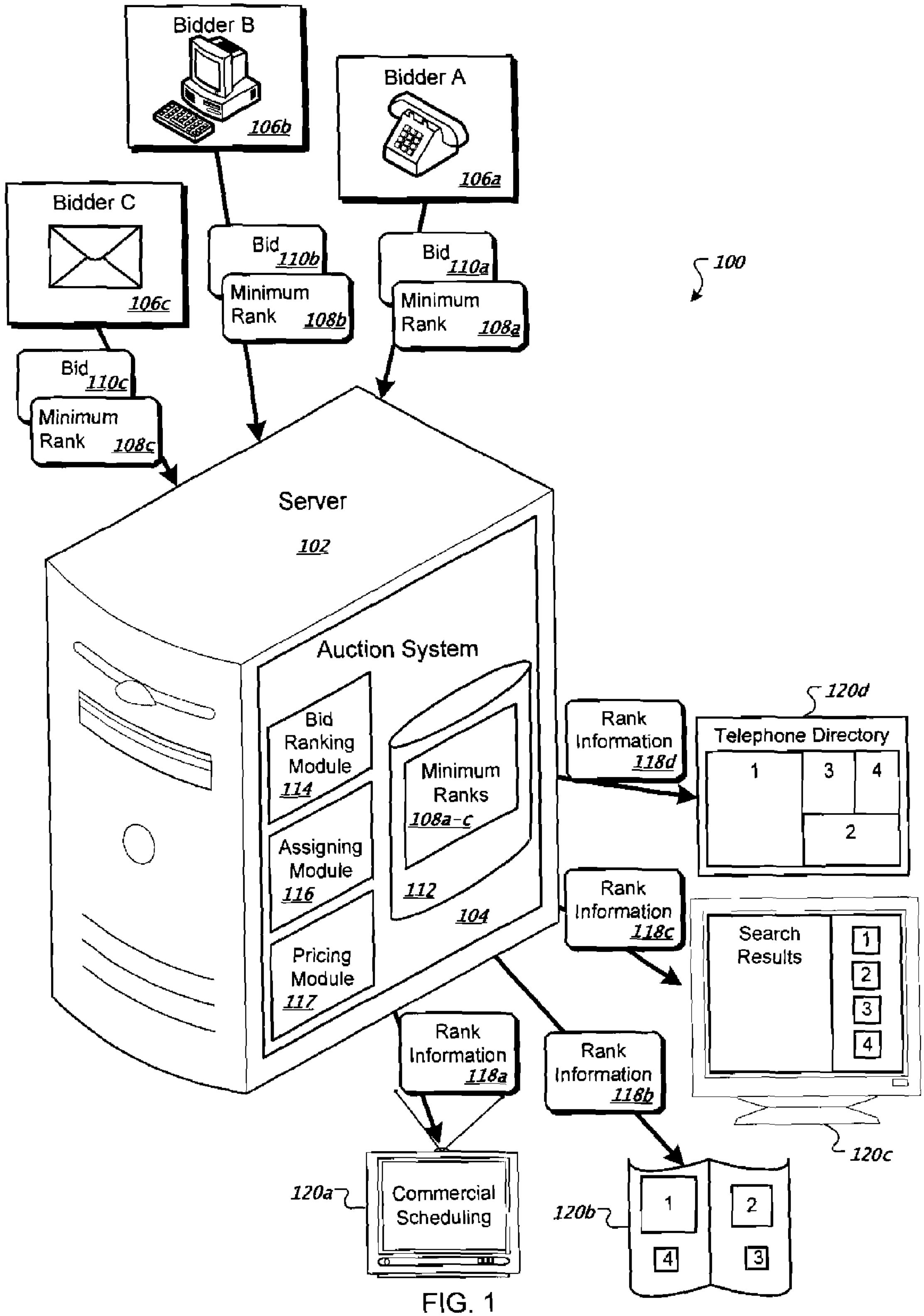
FIG. 1 is a schematic diagram of an exemplary system for auctioning ranked goods.
Figure 2:
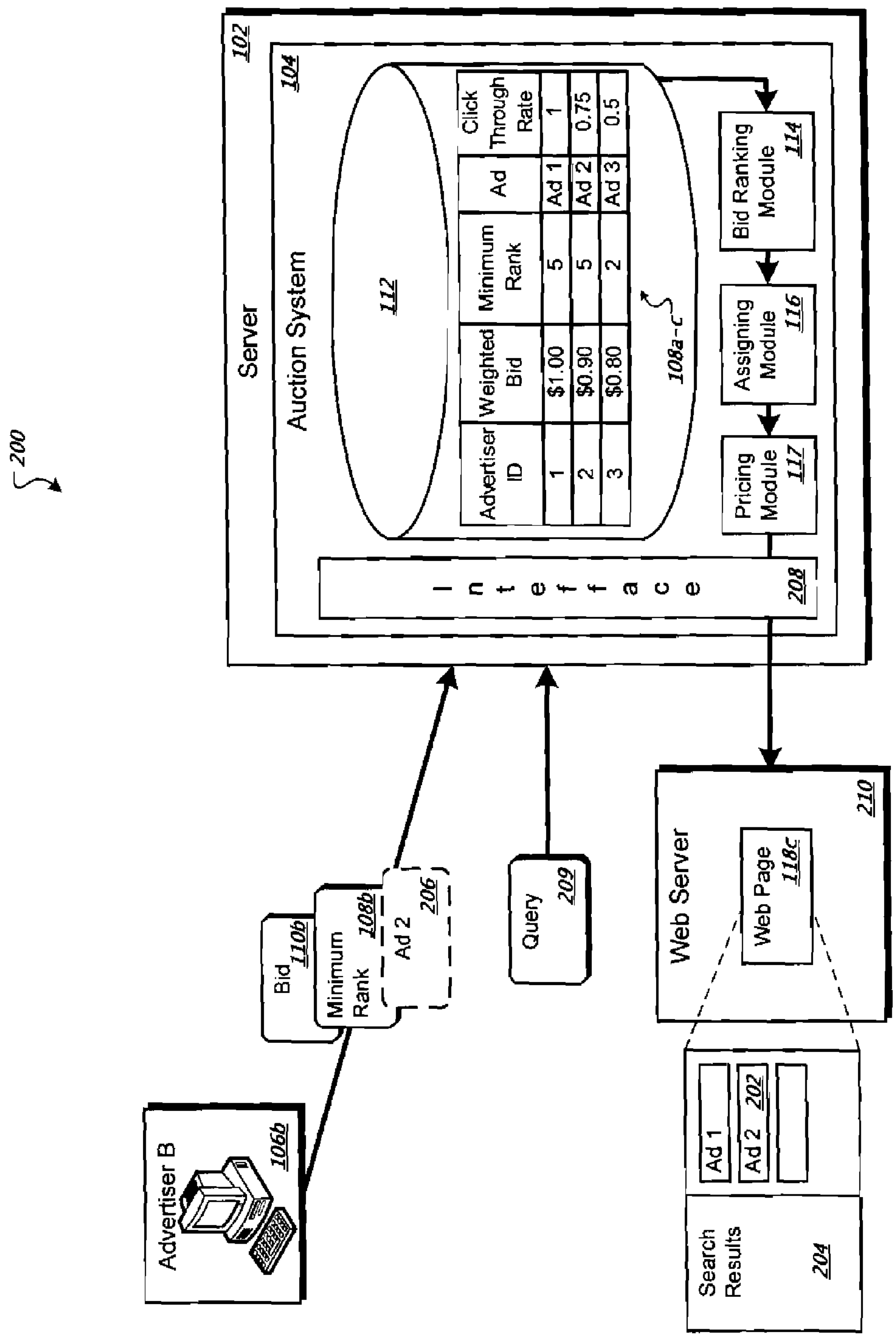
FIG. 2 is a block diagram of an exemplary system for auctioning a ranked good, such as an advertisement (ad) slot.

In certain implementations, an auction system, such as a system 100 of FIG. 1 or a system 200 of FIG. 2, can assigned ranked goods to bidders based on bids and minimum rank information submitted by the bidders. The minimum rank information can indicate a lowest rank that a bidder is willing to accept for a ranked good. For example, if the ranked goods are online advertisements (ads), a rank for a particular good may correspond to a position of the online ad on a web page. If an online ad is associated with a first rank, the ad may be displayed at a top position of a vertical column of ads on a right side of a web page. If an online ad is associated with a second rank, the ad may be displayed one position below the first ad, and so on. In this example, the minimum rank information can specify the lowest position in the vertical column that a bidder will accept.

In certain implementations, the auction system can arrange, or order, bidders based on the submitted bids and assign a corresponding ranked good to each bidder. For example, the system can assign a first bidder with a highest bid to a first ranked good, a second bidder with the next highest bid to a second ranked good, etc. If the system assigns a bidder a ranked good that has a ranking below (or possibly equal to or below) the minimum rank specified by that bidder, the system can remove the bidder from the auction and reassign the ranked good to a bidder with the next highest bid.

In certain implementations, the auction system can assign a cost for a ranked good based on the bid of the next highest bidder if the next highest bidder specified a minimum rank that includes the ranked good to which the system is assigning a cost. For example, the system can order bidders based on their bids, and the system can assigned bidders to corresponding ranked goods based on their bids.

In determining the cost of a ranked good, the system can, for example, identify the next highest bidder for the ranked good. If the next highest bidder has specified a minimum rank that includes the ranked good, the system can use the next highest bidder's bid as the price for the ranked good.

However, if the minimum rank does not include the ranked good (e.g., the minimum rank is 7 and the ranked good has a rank of 8), the system selects the next bidder in line below the next highest bidder and determines if this next bidder has a minimum rank that includes the ranked good. In some implementations, the process can be repeated until a bidder is selected that has a minimum rank that includes the ranked good to which the system is assigning a cost. After locating an eligible bidder, the system can assign the bid associated with the eligible bidder as the cost of the ranked good.

One implementation is described in association with FIG. 1. FIG. 1 is a schematic diagram of the exemplary system 100 for auctioning ranked goods. The system 100 includes a server 102 that includes an auction system 104. The auction system 104 is in communication with one or more bidders 106*a-c*, such as by telephone, mail, or a computer network.

In certain implementations, the auction system 104 receives minimum ranks 108*a-c* and bids 110*a-c* for ranked goods from each of the bidders 106*a-c*, respectively. The minimum ranks 108*a-c* can each indicate a lowest ranked good that the associated bidders 106*a-c*, respectively, are willing to accept. For example, the bidders 106*a-c* may be advertisers bidding for ad positions on a web page. The advertisers each have a minimum ad slot that the advertiser is willing to accept. For example, one advertiser can specify his minimum rank is the third ad slot from the top of the web page. The minimum rank indicates that the advertiser bidder will accept any ad slot in the range of the first slot through the third slot. In another example, the bidders 106*a-c* may be concertgoers bidding on ranked goods, such as seats in a theater. The concert bidders each have a minimum seat rank that the concert bidder is willing to accept. For example, one concert bidder can specify that a fourth row from a stage is his minimum seat rank. The minimum seat rank indicates that the concert bidder will accept a seat in the range of the first row through the fourth row, but not subsequent rows, such as the fifth row.

In another example, the bidders 106*a-c* may be passengers on a commercial airline service bidding on ranked goods, such as seats in an airplane. The passenger bidders each have a minimum seat rank that the passenger bidder is willing to accept, such as an exit seat, an aisle seat, a window seat, a first class seat, or a particular number of rows from the front of the airplane.

The auction system 104 stores the minimum ranks 108*a-c* and the bids 110*a-c* in a repository 112, according to some implementations. A bid ranking module 114, within the auction system 104, can rank the bidders' eligible bids from lowest to highest. An eligible bid may be, for example, a bid that meets a reserve bid price, or a minimum bid amount set and stored by the auction system 104.

In certain implementations, an assigning module 116 determines what ranked good, if any, will be assigned to each of the bidders 106*a-c*. The assigning module 116 assigns a ranked good to each of the bidders 106*a-c* based on an amount of the bidders' bids (e.g., the bidder with a highest eligible bid to a bidder with a lowest eligible bid). The assigning module 116 also can assign ranked goods using the minimum ranks 108*a-c* submitted by the bidders.

For example, the assigning module 116 can first assign the bidder 106*a* with the highest eligible bid 110*a* a highest ranked good (e.g., a first ad slot). If the minimum rank 108*b* of the next highest bidder 106*b* is less than or (less than or equal to) the next available ranked good (e.g., a second ad slot), then the assigning module 116 assigns that ranked good (the second ad slot) to the bidder 106*b*.

Otherwise, in some implementations, if the minimum rank 108*b* is higher than the next available ranked good, then the assigning module 116 does not assign a ranked good to the bidder 106*b*. For example, if the minimum rank 108*b* of the bidder 106*b* is one (e.g., the highest ranked good), then the bidder 106*b* is not assigned a ranked good if the bidder 106*a* has already been assigned the highest ranked good. Alternatively, if the minimum rank 108*b* of the bidder 106*b* is two or lower, then the bidder 106*b* is assigned the second highest ranked good. The assigning module 116 can continue the assignment process for all of the bidders 106*a-c*.

In certain implementations, a pricing module 117 determines the price or cost that each of the bidders 106*a-c* are charged for the ranked good assigned to the bidder. In particular, the pricing module 117 can assign a charge for each ranked good based on a bid of the next highest bidder whose minimum rank is less than the rank being priced.

For example, the bidder 106*b* may have the second highest bid 110*b* with a value of $5.00 and the minimum rank 108*b* of two. The bidder 106*b* is assigned the second ranked good as the rank of "two" is within the minimum rank 108*b* of the bidder 106*b*. The cost that the bidder 106*b* is charged is the bid of the next highest bidder whose minimum rank is less than the rank of "two," which is the rank of the good assigned to the bidder 106*b*. The bidder 106*c* may have the third highest bid 110*c* of $4.00 and the minimum rank 108*c* of three. The minimum rank 108*c* of the next highest bidder 106*c* is less than the rank of two assigned to the bidder 106*b*. Therefore, in this example, the pricing module 117 determines that the cost to the bidder 106*b* of the second ranked good is $4.00. The pricing module 117 continues the pricing process for all of the bidders 106*a-c*.

In certain implementations, this auction method may provide an envy-free or symmetric Nash equilibrium with the same outcome in allocation and pricing as the Vickrey-Clarke-Groves auction. That is, the auction may exhibit a Nash equilibrium because each individual bidder has nothing to gain by either changing its bid or minimum rank without another bidder also changing its bid or minimum rank. This is described in additional detail in "A method for conducting an auction for ranked positions among bidders that specify a bid and a maximum position," by Gagan Aggarwal, Jon Feldman, S. Muthukrishnan, Rohit Rao, and Adam Wildaysky, Proceedings of the Fourth Workshop on Approximation and Online Algorithms (WAOA), 2006, the entirety of which is incorporated here.

In the implementation of FIG. 1, the auction system 104 transmits the assignments in rank information 118*a-d* to be applied to one or more media 120*a-d*, such as a web page, a printed page, a television time schedule, or a radio time schedule. In certain implementations, the minimum ranks 108*a-c* may include information, such as a sequential order, a minimum size, or a minimum amount of color in the assigned ranked good.

For example, each of the media 120*a-d* may include four ranked goods to be auctioned. The four ranked goods may be ranked according to their sequential order, such as a sequence of commercials in the television medium 120*a*, where the first appearing commercial at 7:15 p.m. is ranked first, the second appearing commercial is ranked second, etc. In another example, the commercials can be ranked based on an estimated amount of viewers for the time slot. More specifically, a commercial played at 8 p.m. before a popular sit-corn may be ranked first, while a commercial played at 1 a.m. after an infomercial may be ranked fourth. In some implementations, the ranking information for each good can be stored in the repository 112.

In another example, the telephone directory printed medium 120*d* can have four slots that are ranked according to size and position, such as s a large-sized ad on the upper left of a page may be ranked 1, a medium-sized ad on the lower right page may be ranked 2, and small-sized ads on the upper right may be ranked 3 and 4, respectively. In another example, the slots can be ranked based on whether they are in color. The newspaper printed medium 120*b* may have color ads on the upper half of pages (ads ranked 1 and 2) and black/white ads on the lower half of pages (ads ranked 3 and 4).

In other implementations, rankings for goods can be based on a display format of the good. For example, the web page medium 120*c* may rank online ads that include image higher than online ads that only include text.

In certain implementations, the auction system 104 charges the bidders 106*a-c* using the costs determined by the pricing module 117. For example, the auction system 104 may include account information for each of the bidders 106*a-c*, such as bank account and bank routing numbers or a credit number. The auction system 104 may use the account information and the costs to bill each of the bidders 106*a-c*. The billing may be further based on a number of times a bidder is assigned a ranked good in the media 120*a-d*. For example, in the case where the ranked goods are ad slots in the web page media 120*c*, a cost may be based on the number of times the ad is presented or the number of times a user of the web page media 120*c* selects the ad.

FIG. 2 is a block diagram of an exemplary system 200 for auctioning a ranked good, such as an ad slot 202 adjacent to a search results portion 204 of a web page. The bidder 106*b* may provide an ad 206 with the bid 110*b* and the minimum rank 108*b* to the auction system 104 via an interface 208. The auction system 104 can store the ad 206 and the bid 110*b* in the repository 112. The bid 110*b* may be in the form of a cost per impression, where an impression can include a single instance of an ad presentation, or where an impression includes when a viewer performs an action based on the ad presentation (e.g., selects a hyperlink in the ad, makes a purchase after navigating to a web page from the selected hyperlink, etc.).

In another implementation a bidder may submit a value, such as a cost per impression that the bidder is willing to pay, and this value is combined with another value to generate the bid. For example, the auction system 104 may weight the value submitted by a bidder based on a click through rate (CTR) for the associated ad 206 to determine a weighted bid. The click through rate can be, for example, the number of times that past viewers have selected a hyperlink included in the ad 206 when the ad is presented with search results. For example, a CTR of 0.75 may indicate that, statistically, three quarters of the viewers of the ad 206 have selected the hyperlink included in the ad 206. The CTR can be multiplied by the submitted value to generate a weighted bid that favors ads that have high CTRs.

The auction system 104 receives a query 209, for example, as a result of a request for a search of web pages. In one example, the query 209 may include keywords to be searched for within the web pages. In certain implementations, the bid 110*b* of the bidder 106*b* is associated with one or more of the keywords in the query 209. That is, the bidder 106*b* bids to have the ad 206 presented in association with the search results 204 from the query 209 including the keywords.

For example, the query 209 may include the keywords "file" and "taxes." The advertiser 106*b* may provide a tax preparation service and makes a bid to have the ad 206 for its services presented in association with web searches based on the keyword "taxes." The auction system 104 determines in which ad slot, if any, to present the ad 206 and a cost to charge the bidder 106*b*.

In the implementation shown in FIG. 2, the bid ranking module 114 ranks the bidder 106*b* according to the bids 110*a-c* (or the weighted bids) from highest to lowest, for example, the bidder 106*a* may be first, the bidder 106*b* may be second, and the bidder 106*c* may be third. The assigning module 116 can determine in which ad slot, if any, each of the ads will be placed. For example, the bidder 106*b* with the second highest weighted bid of $0.90, is assigned the second ad slot ranked good 202. This is because the bidder 106*b* has the second highest weighted bid and the second ad slot ranked good 202 is greater than the minimum rank 108*b* of the bidder 106*b*.

In certain implementations, the pricing module 117 prices the ad slots assigned to the advertisers. For example, the pricing module 117 assigns a cost to an assigned ranked good, where the cost is based on the bid of the next highest bidder whose minimum rank is less than (or less than or equal to) the assigned ranked good. In some implementations, the pricing module 117 determines the bid of the next highest bidder by the click-through-rate associated with that bidder to generate a weighted bid that is used to determine the ordering of the bidders.

In other implementations, the cost may be based on the weighted bid of the next highest bidder and the click-through-rate of the advertiser that was assigned the ranked good. For example, the pricing module 117 may determine that the next highest weighted bid after the weighted bid of the advertiser 106*b* is $0.80. The pricing module 117 divides the determined weighted bid by the click-through-rate of the advertiser 106*b* to determine a cost of $1.07 to the advertiser 106*b* for the ad slot 202.

The auction system 104 outputs the rank information 118*c* via the interface 208 to a web server 210, in some implementations. The web server 210 can present the ad 206 in the second ad slot 202, along with the search results 204. The auction system 104 bills the advertiser 106*b* for the assignment of the ad slot 202. The auction system 104 may directly debit an account, such as a credit card or bank account. Alternatively, the auction system 104 may send an invoice to the advertiser 106*b* including the cost of the ad slot 202. In certain implementations, the auction system 104 bills the advertiser 106*b* after an action occurs as a result of presenting the ad 206, such as a click on a hyperlink or a purchase of a product.

Figure 3:
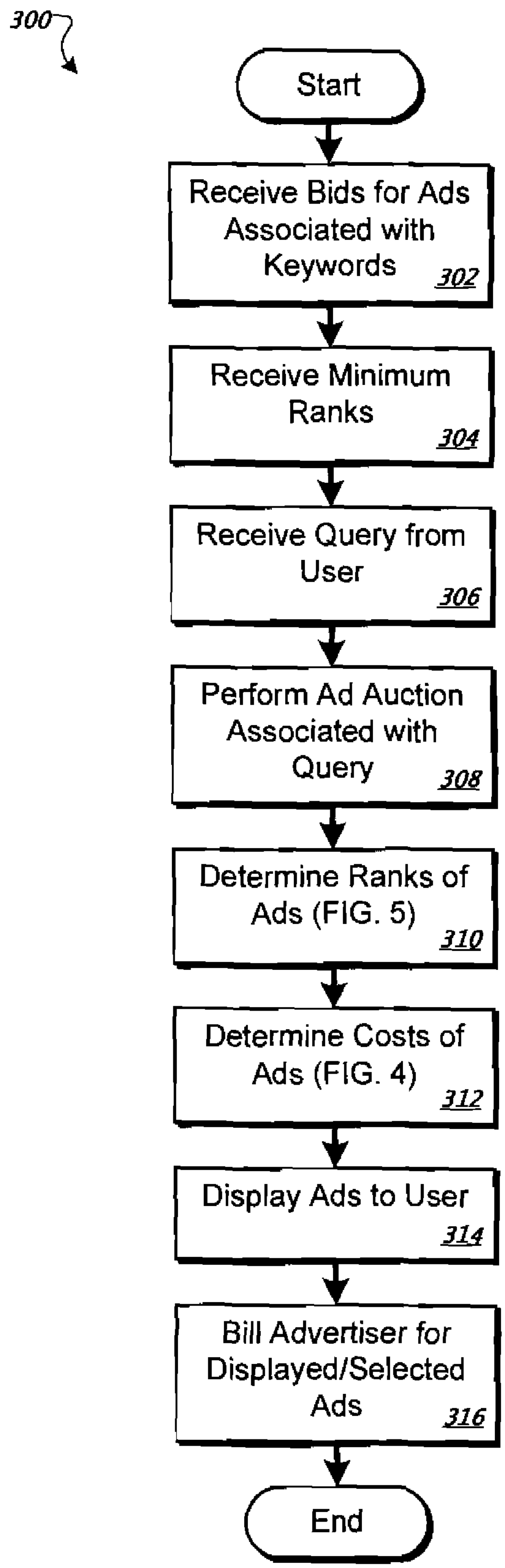
FIG. 3 is a flow chart of an exemplary process for auctioning an ad slot.
Figure 4:
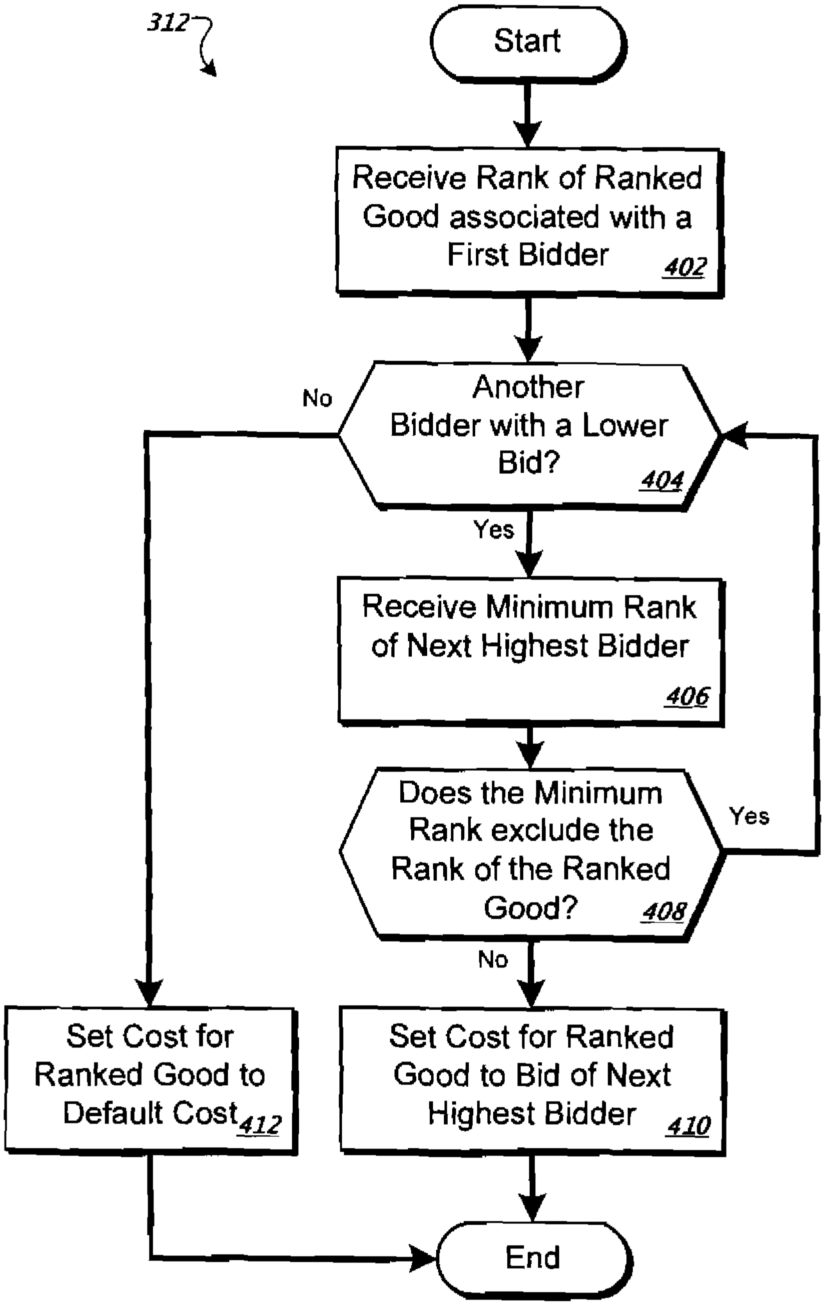
FIG. 4 is a flow chart of an exemplary process for pricing auctioned ranked goods.
Figure 5:
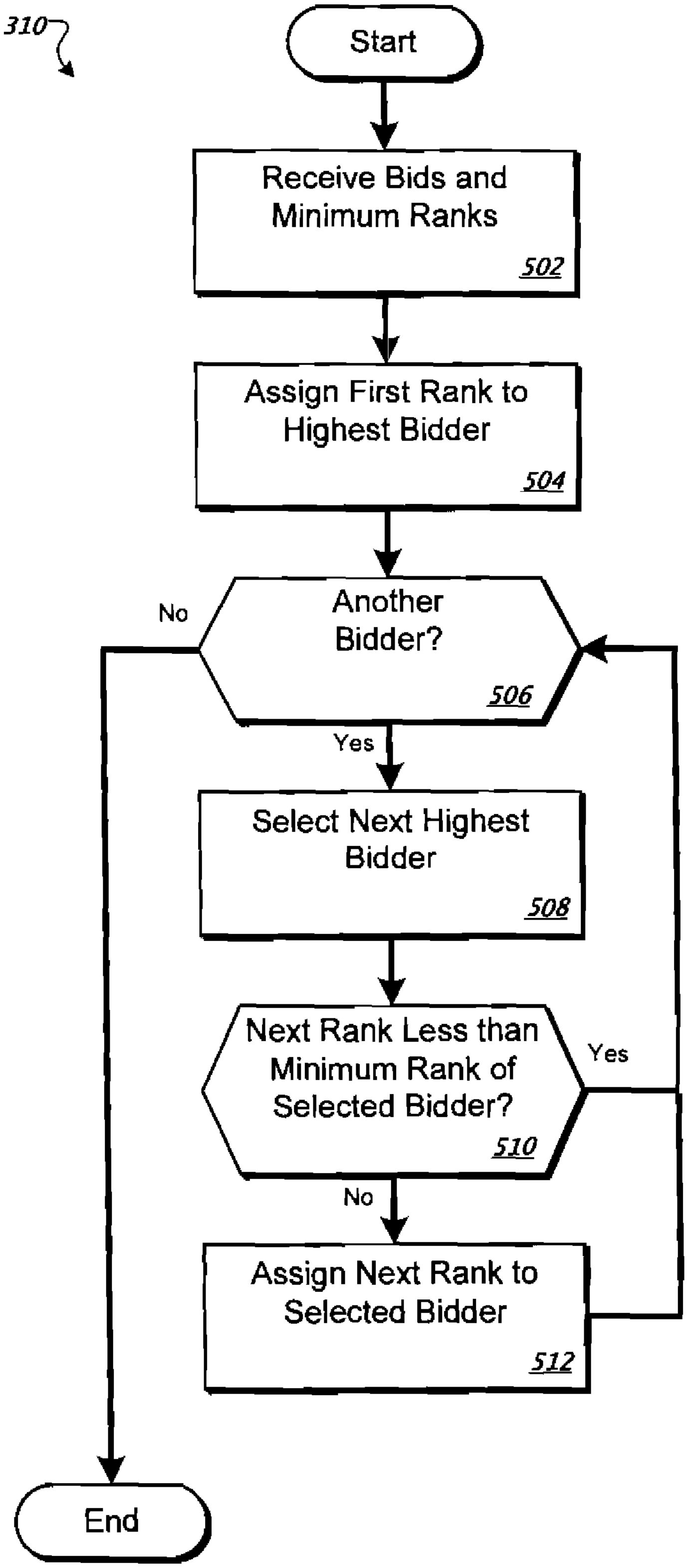
FIG. 5 is a flow chart of an exemplary process for assigning auctioned ranked goods to bidders.

FIGS. 3, 4, and 5 are flow charts showing examples of processes 300, 312, and 310, respectively. The processes 300, 312, and 310 may be performed, for example, by a system such as the system 100 or 200. For clarity of presentation, the description that follows uses components of the systems 100 and 200 as the basis of examples for describing the processes 300, 312, and 310. However, components of another system, or components from a combination of systems, may be used to perform the processes 300, 312, and 310.

Referring to FIG. 3, the flow chart shows the exemplary process 300 for auctioning ranked goods, such as ad slots. The process 300 begins in step 302 with receiving bids (or values used to generated weighted bids) for ad slots associated with keywords. For example, the auction system 104 receives the bid 110*b* from the advertiser 106*b* for ad slots associated with the keyword "taxes."

In step 304, minimum ranks associated with the bids are received. For example, the auction system 104 receives the minimum rank 108*b* of five from the advertiser 106*c*, indicating that the advertiser 106*c* will accept ad slots ranked five and above.

In certain implementations, the auction system 104 can generate a minimum rank for the bidder if one is not provided. For example, the minimum rank can be equal to the lowest rank of the ranked goods (e.g., the minimum rank would equal "5," if only five ad slots were available). In other implementations, the auction system 104 can generate the minimum rank based on an average or medium of current minimum ranks submitted by the other bidders. In yet other implementations, the auction system 104 can generate the minimum rank based on previous minimum ranks submitted by the bidder in similar auctions (e.g., auctions for the same or similar keywords) or that were submitted by the bidder in all previous auctions.

In step 306, a query including one or more keywords from a user is received. For example, the auction system 104 receives the query 209 including the keywords "file" and "taxes."

In step 308, an ad auction associated with the keywords in the query is performed. For example, the bid ranking module 114 can order the bids 110*a-c* received from the bidders 106*a-c* based on the bid amounts. In certain implementations, the bid ranking module 114 multiplies the bids 110*a-c* by a weighting factor before ordering, such as a click-through-rate of each bidder in the case of ad slots for web pages.

A rank is determined for each of the bidders in step 310. For example, the assigning module 116 can determine the ranks assigned to the advertisers 106*a-c*. Each rank corresponds to a particular ad slot. The assigning module 116 assigns the ranks to the advertisers 106*a-c* based on the order determined by the bid ranking module 114. In certain implementations, the assigning module 116 does not assign a rank to an advertiser where the minimum rank of the advertiser is greater than the rank to be assigned. This will be discussed in more detail in association with FIG. 5.

A cost for each of the ranks assigned to the bidders is determined in step 312. For example, the pricing module 117 can determine costs for the ranked goods assigned to the advertisers 106*a-c*. The cost of a ranked good assigned to a bidder is based on the bid of the next highest bidder that specified a minimum rank that includes the rank of the good being assigned a cost. This will be discussed in more detail in association with FIG. 4.

In step 314, ads are displayed to the user. For example, the auction system 104 outputs the ads, including the ad 206, to the web server 210. The web server 210 presents the search results 204 and the ad slots with ads to the user that submitted the search query.

In step 316, the advertisers are charged for the display or selection of the ads. For example, the auction system 104 may directly debit a credit card or bank account for the costs when the ads are presented to the user or when the user performs an action, such as clicking on a hyperlink in an ad.

Referring to FIG. 4, the flow chart shows the exemplary process 312 for pricing auctioned ranked goods. The process 312 begins in step 402 with receiving a rank of a good assigned to a first bidder. For example, the assigning module 116 can assign advertiser 106*b* an ad slot that has a ranking of "2" (e.g., the second ad displayed from the top in a vertical column of ads). The assigning module can transmit this ranking to the pricing module 117.

If there is another bidder with a lower bid, as indicated by step 404, then a minimum rank associated with the next highest ranked bidder can be received, as indicated by step 406. For example, the pricing module 117 receives the minimum rank 108*c* from the advertiser 106*c*, which is the next highest bidder relative to the advertiser 106*b*.

If the minimum rank of the next highest bidder is not higher than the rank assigned to the bidder as indicated in step 408, then a cost for the ranked good is set to the bid of the next highest bidder. For example, the pricing module 117 sets the cost of the ad slot 202 assigned to the advertiser 106*b* as $0.80 because the next highest bidder, advertiser 106*c*, has a minimum rank of "2," which is inclusive (and in fact, equal to) the second ranked ad slot assigned to the advertiser 106*b*.

Otherwise, if the minimum rank of the next highest bidder is higher than the rank of the good assigned to the bidder, then it is determined if there is another bidder with a lower bid than the previously selected next highest bidder, as indicated by the step 404.

If there is not another bidder, the cost of the ranked good is set to a default cost, as indicated by step 412. For example, the pricing module 117 may determine an average cost for the particular ranked good from past auctions and assign the average cost to the bidder where no next highest bidder has a minimum rank greater than the rank assigned to the bidder.

The process 312 can end after steps 412 or 410. In some implementations, the process 312 can be executed repeatedly to assign a cost to each ranked good.

Referring to FIG. 5, the flow chart shows the exemplary process 310 for assigning auctioned ranked goods to bidders. The process 310 begins in step 502 with receiving bids and minimum ranks from bidders. For example, the auction system 104 can receive the bids 110*a-c* and the minimum ranks 108*a-c* from the advertisers 106*a-c*. The bid ranking module 114 orders the bids from highest to lowest based on the amount of the bid. In certain implementations, the bid ranking module 114 weights the bids 110*a-c* based on the click-through-rates of the advertisers 106*a-c*.

In step 504, a first rank is assigned to a highest bidder. For example, the assigning module 116 assigns the first rank to the advertiser 106*a*, which submitted the highest bid of all the bidders.

In step 506, it is determined If there is another bidder. If so, a next highest bidder is selected, as indicated in step 508. For example, the assigning module 116 selects the advertiser 106*b*, which submitted the next highest bid.

In step 510, it is determined if the next rank to be assigned to the next highest bidder is less than a rank specified by a minimum rank of the next highest bidder. If the ranked to be assigned to the next highest bidder is within the minimum rank of the next highest bidder, then the rank is assigned to the next highest bidder, as indicated by step 512. For example, the next highest bidder may have a minimum rank of 5 and is currently ranked as the fourth highest bidder (which corresponds to the fourth ranked good). In this case, the bidder would be assigned the fourth ranked good because it does not violate the minimum rank of "5" specified by the bidder.

If the next rank to be assigned is less than the minimum rank of the next highest bidder (e.g., the minimum rank is "3" and the assigned rank is "4"), then it may be determined if there is another bidder with a lower bid, as indicated by step 506. If no other bidders remain, then the process 310 can end.

FIG. 6 shows an exemplary bidding scenario 600 in an auction for ranked goods. The scenario 600 includes bidders 602, A, B, C, D, and E. The bidders 602 send bids 604 and minimum ranks 606 to the auction system 104. In certain implementations, the bid ranking module 114 orders the bids 604 from highest to lowest, $5.00, $4.00, $3.00, $2.00, and $1.00. In this example, the bids 604 are not weighted based on additional criteria, such as click-through-rates.

In certain implementations, the assigning module 116 assigns ranks 608 to the bidders 602. Bidder A has the highest bid, $5.00, and is therefore assigned the first rank (which can correspond to a first ranked good, such as a first ranked advertising slot). Bidder B has the second highest bid $4.00, a minimum rank of 5, and is, consequently, assigned the second rank. Bidder C has the third highest bid $3.00 and a minimum rank of 5, and therefore bidder C is assigned the third rank. Bidder D has the fourth highest bid, $2.00, but bidder D has a minimum rank of 2, therefore bidder D is not assigned a rank because the rank that would be assigned to bidder D is below the specified minimum rank of 2. Bidder E has the fifth highest bid, $1.00, and a minimum rank of 5, therefore bidder E is assigned the fourth rank.

The pricing module 117 assigns costs 610 to the ranks 608 assigned to the bidders 602. In some implementations, the pricing module 117 determines the costs 610 before removing bidders that do not have an assigned rank. The pricing module 117 determines the costs 610 as the bid of the next highest bidder that was assigned a rank and whose minimum rank encompasses the rank to be priced. The pricing module 117 determines the cost to bidder A of the first rank as $4.00, which is the bid of bidder B. The pricing module 117 determines the cost to bidder B of the second rank as $3.00, which is the bid of bidder C. The pricing module 117 determines the cost to bidder C of the third rank as $1.00, which is the bid of bidder E.

The cost to bidder C is not the bid $2.00 of the bidder D because bidder D's minimum rank of 2 excludes the rank of assigned rank of C, which is the third rank. In another example, if the minimum rank of D was 3, the rank assigned to C would be assigned a cost of $2.00 even though the bidder D would not receive a rank because bidder D's minimum rank of 3 would still exclude it from being assigned the fourth rank.

The bidder E does not have a next highest bidder, therefore, in some implementations, the pricing module 117 assigns a default cost, such as $0.05, to the bidder E.

Figure 7:
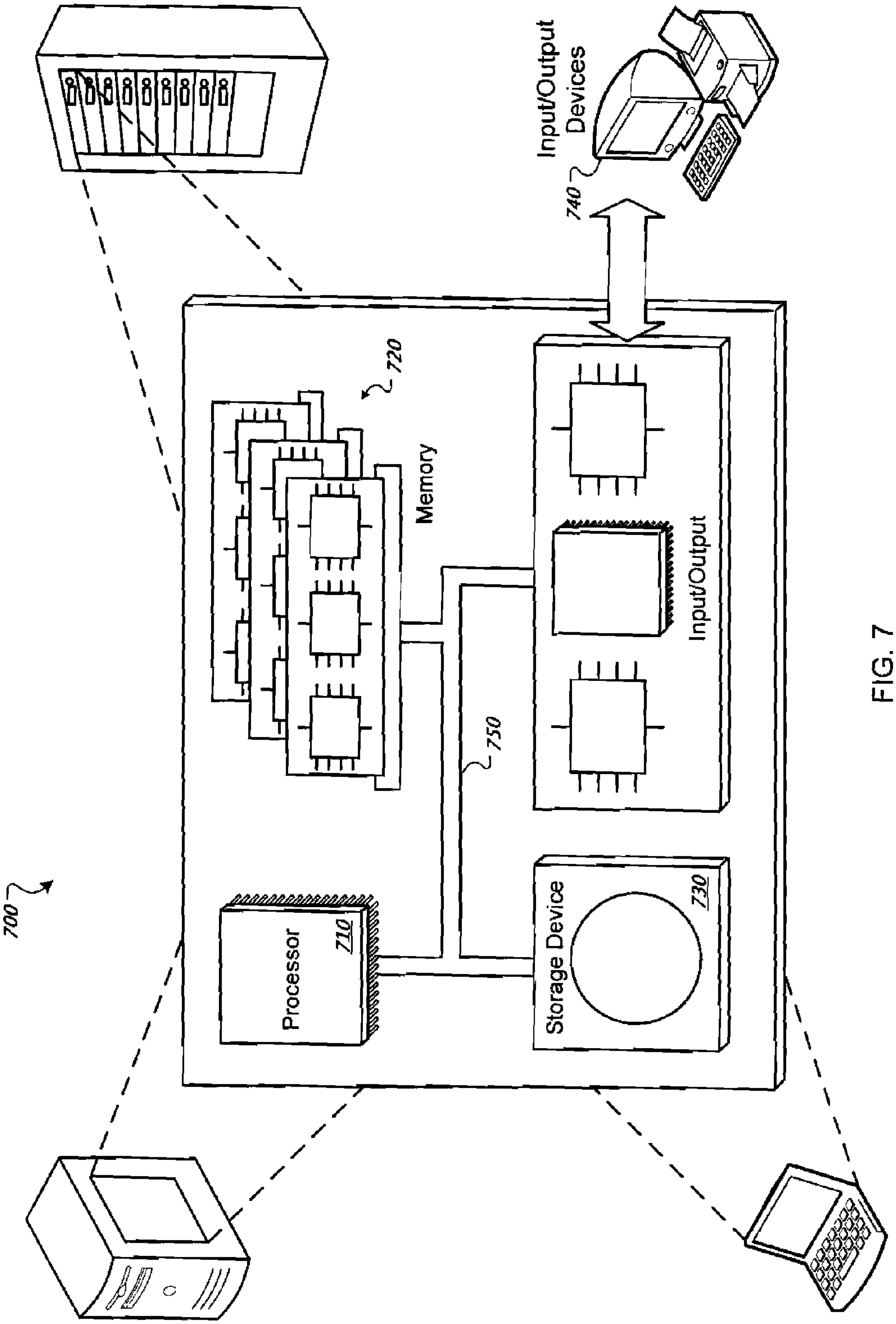
FIG. 7 is a block diagram of a computing system that can be used in connection with methods described in this document.

FIG. 7 is a schematic diagram of a generic computer system 700. The system 700 can be used for the operations described in association with any of the computer-implement methods described previously, according to one implementation. The system 700 includes a processor 710, a memory 720, a storage device 730, and an input/output device 740. Each of the components 710, 720, 730, and 740 are interconnected using a system bus 750. The processor 710 is capable of processing instructions for execution within the system 700. In one implementation, the processor 710 is a single-threaded processor. In another implementation, the processor 710 is a multi-threaded processor. The processor 710 is capable of processing instructions stored in the memory 720 or on the storage device 730 to display graphical information for a user interface on the input/output device 740.

The memory 720 stores information within the system 700. In one implementation, the memory 720 is a computer-readable medium. In one implementation, the memory 720 is a volatile memory unit. In another implementation, the memory 720 is a non-volatile memory unit.

The storage device 730 is capable of providing mass storage for the system 700. In one implementation, the storage device 730 is a computer-readable medium. In various different implementations, the storage device 730 may be a floppy disk device, a hard disk device, an optical disk device, or a tape device.

The input/output device 740 provides input/output operations for the system 700. In one implementation, the input/output device 740 includes a keyboard and/or pointing device. In another implementation, the input/output device 740 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them.

The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible. For example, in certain implementations, the ranked goods can include other items, such as substantially identical items having different physical conditions. For example, the ranked goods could include baseball cards for Hank Aaron in various physical states of condition from mint condition to very poor condition.

In other implementations, the ranked goods can also include items, such as substantially identical items having different physical locations. For example, the ranked good may be a particular condominium model that is located at an increasing distance from a desired location, such as a ski slope, lake, ocean, etc. In another example, the ranked good can be hotel rooms (where the rooms have similar attributes, such as space, cable TV, etc.) that are located at an increase distance from a particular location or geographical zone, such as distance from the "Strip" in Las Vegas.

Additionally, the logic flows depicted in the figures do not require the particular order shown, or sequential order, to achieve desirable results. In addition, other steps may be provided, or steps may be eliminated, from the described flows, and other components may be added to, or removed from, the described systems. Nevertheless, it will be understood that various modifications may be made without departing from the spirit and scope of the following claims. Accordingly, other implementations are within the scope of the following claims.

What is claimed is:

1. A computer implemented method, comprising:

receiving a plurality of bids for advertising positions that are associated with a keyword;

generating, by one or more processors, a first minimum rank indicator associated with a bid from the plurality of bids and specifying a lowest advertising position rank that is acceptable to a first bidder;

receiving a query and one or more keywords associated with the query;

performing an auction based at least in part on the query, the one or more keywords that are associated with the query, and the plurality of bids;

based on the bid from the plurality of bids and on the auction, assigning, by the one or more processors, an advertising position rank to the first bidder;

determining, based on the first minimum rank indicator, that the advertising position rank assigned to the first bidder is not acceptable to the first bidder; and based on determining that the advertising position rank assigned to the first bidder is not acceptable to the first bidder, preventing, by the one or more processors, the advertising position rank from being assigned to the first bidder.

2. The method of claim 1, further comprising outputting, by the one or more processors when the advertising position rank is assigned to the first bidder, an indicator of a cost of the assigned advertising position rank based on a second bid from the plurality of bids, the second bid being associated with a next highest bidder having a second advertising position rank indicator that specifies a rank that is inclusive of the rank of the advertising position rank assigned to the first bidder.

3. The method of claim 1, wherein generating the first minimum rank indicator comprises generating the first minimum rank indicator based on a range of possible ranks for the advertising position ranks.

4. The method of claim 3, wherein generating the first minimum rank indicator comprises selecting a value for the first minimum rank indicator that is substantially equal to a lowest rank in the range.

5. The method of claim 1, wherein each advertisement position comprises a position in time.

6. The method of claim 1, wherein the advertisement positions comprise periods in an audio or video broadcast.

7. The method of claim 1, wherein the advertisement positions comprise locations on an advertising medium.

8. The method of claim 7, wherein the advertising medium comprises a printed or digital advertising medium.

9. The method of claim 1, wherein the advertising positions are selected from a group consisting of physical locations at an entertainment venue, physical locations on a travel provider, substantially identical items having different physical conditions, and substantially identical items having different physical locations.

10. The method of claim 1, further comprising ranking the plurality of bids associated with bidders based on an amount of each bid from the plurality of bids.

11. The method of claim 10, further comprising associating the ranked bids with advertising position ranks, wherein a highest bid from the plurality of bids is associated with a highest advertising position rank.

12. The method of claim 11, wherein, when the first minimum rank indicator indicates that the rank of the advertising position rank is not acceptable to the first bidder, associating remaining ranked bids with the ranked goods as if the bid from the plurality of bids was not present.

13. A non-transitory computer-readable medium storing software comprising instructions executable by one or more computers which, upon such execution, cause the one or more computers to perform operations comprising:

receiving a plurality of bids for advertising positions that are associated with a keyword;

generating, by one or more processors, for each of a plurality of bidders, a minimum position indicator that specifies a lowest ranked advertisement position that is acceptable for advertisement placement in a ranked advertisement position;

receiving a query and one or more keywords associated with the query;

performing an auction based at least in part on the query, the one or more keywords that are associated with the query, and the plurality of bids;

assigning, by the one or more processors, a ranked advertisement position for placement of an advertisement associated with a first bidder based on a first bid from the plurality of bids from the first bidder;

determining, based on the minimum position indicator, that the ranked advertisement position assigned for placement of the advertisement is not acceptable to the first bidder; and based on determining that the ranked advertisement position assigned for placement of the advertisement is not acceptable to the first bidder, preventing, by the one or more processors, the ranked advertisement position from being assigned to the first bidder.

14. The medium of claim 13, wherein the first bid comprises a value submitted by the first bidder.

15. The medium of claim 14, wherein the first bid further comprises a weighting factor applied to the value.

16. The medium of claim 15, the operations further comprising generating the weighting factor based on a click-through rate of the advertisement associated with the first bidder.

17. A system, comprising:

a processor for generating a first minimum rank indicator specifying a lowest advertising position rank of an advertising position that is acceptable to a first bidder; and an assigning module for assigning an advertising position to the first bidder based on a first bid associated with the first bidder and the first minimum rank indicator, for determining that the advertising position rank is not acceptable to the first bidder, and for preventing, based on determining that the advertising position rank is not acceptable to the first bidder, the advertising position from being assigned with the first bidder.

18. A computer implemented method, comprising:

accessing, by one or more processors, a plurality of bids for advertising positions;

generating, by the one or more processors, minimum rank indicators that each specify a lowest rank for a respective advertising position that is acceptable to a respective bidder;

ranking, by the one or more processors, the plurality of bids;

assigning, by the one or more processors, a first bid from the plurality of bids with a first advertising position, the first bid being a highest-ranked bid and the first advertising position being a highest-ranked good;

determining, by the one or more processors, that a rank of a second advertising position is not acceptable to a second bidder associated with a second bid from the plurality of bids based on a minimum rank indicator associated with the second bidder, the second bid being ranked lower than the first bid and the rank of the second advertising position being a lower-ranked than the first advertising position;

determining, by the one or more processors, that the rank of the second advertising position is acceptable to a third bidder associated with a third bid from the plurality of bids based on a minimum rank indicator associated with the third bidder, the third bid being ranked lower than the second bid; and assigning, by the one or more processors and based on determining that the rank of the second advertising position is acceptable to a third bidder, the third bid to the second advertising position.

19. The method of claim 1, further comprising iteratively identifying a plurality of other bids each associated with one of a plurality of next highest bidders each having a minimum rank indicator that specifies a rank that is inclusive of the rank of an advertising position assigned to a previously identified bidder; and outputting, by one or more processors, indicators of costs of advertising positions based on the other bids associated with the plurality of next highest bidders.

20. The method of claim 1, wherein generating the first minimum rank indicator comprises generating the first minimum rank indicator based on an average of current minimum ranks submitted by bidders other than the first bidder.

21. The method of claim 1, wherein generating the first minimum rank indicator comprises generating the first minimum rank indicator based on previous minimum ranks submitted by the first bidder.

22. The medium of claim 13, wherein generating the minimum position indicators comprises generating at least some of the minimum position indicators based on an average of current minimum position indicators submitted by other bidders.

23. The medium of claim 13, wherein generating the minimum position indicators comprises generating at least some of the minimum position indicators based on previous minimum position indicators submitted by the respective bidders.

24. The medium of claim 13, wherein generating the minimum position indicators comprises generating at least some of the minimum position indicators based on a range of possible ranks for the ranked advertisement positions.

25. The medium of claim 24, wherein generating the minimum position indicators comprises selecting a value for at least some of the minimum position indicators that is substantially equal to a lowest rank in the range.

26. The medium of claim 13, the operations further comprising outputting, by the one or more processors when the ranked advertisement position is assigned to the first bidder, an indicator of a cost for the ranked advertisement position based on a second bid submitted by a next highest bidder having a second minimum position indicator that specifies a ranking that is inclusive of the rank of the ranked position assigned to the first bidder.

27. The system of claim 17, further comprising means for outputting an indicator of a cost of the advertising position based on a second bid submitted by a next highest bidder having a second minimum rank indicator that is inclusive of the rank of the assigned advertising position.

28. The system of claim 17, wherein the processor for generating a first minimum rank indicator generates the first minimum rank indicator based on an average of current minimum rank indicators submitted by bidders other than the first bidder.

29. The system of claim 17, wherein the processor for generating a first minimum rank indicator generates the first minimum rank indicator based on previous minimum ranks submitted by the first bidder.

30. The system of claim 17, wherein the processor for generating a first minimum rank indicator generates the first minimum rank indicator based on a range of possible ranks for the ranked good.

31. The system of claim 30, wherein the processor for generating a first minimum rank indicator selects a value for the first minimum rank indicator that is substantially equal to a lowest rank in the range.

* * * * *